Figure 1:
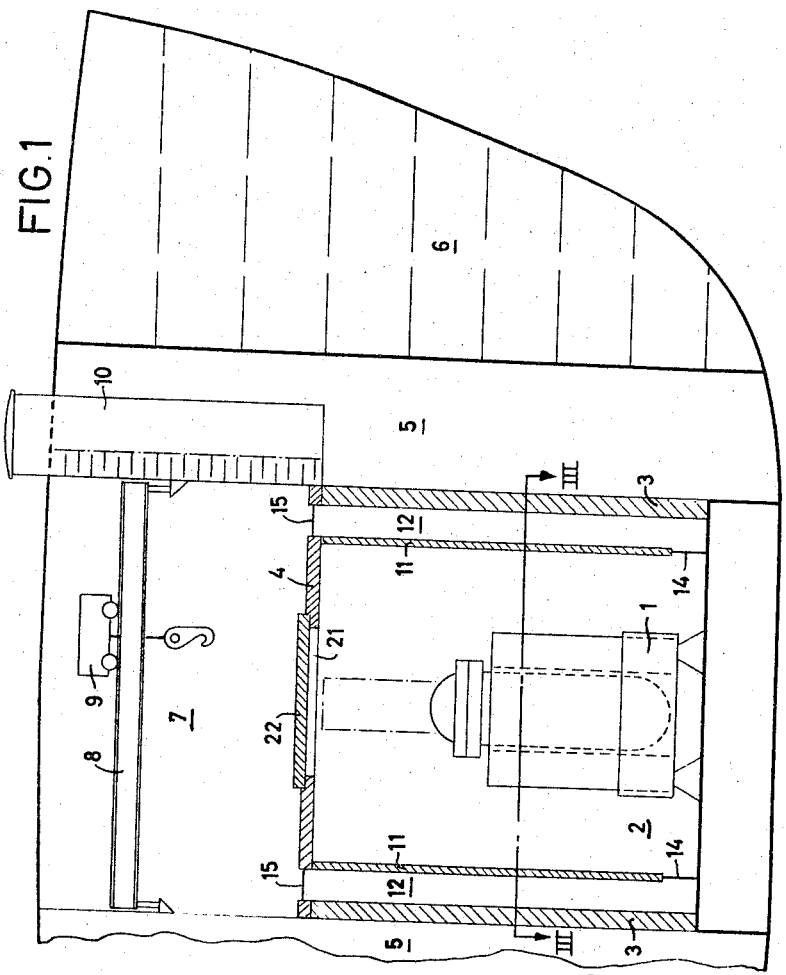

April 18, 1967   P. M. VILLADSEN   3,314,858
NUCLEAR REACTOR CONTAINMENT INSTALLATION
Filed Sept. 17, 1963
3 Sheets-Sheet 2

INVENTOR
Peter Mogens Villadsen
BY
ATTORNEY

United States Patent Office 3,314,858
Patented Apr. 18, 1967

3,314,858
NUCLEAR REACTOR CONTAINMENT
INSTALLATION
Peter Mogens Villadsen, Herlev, Denmark, assignor to Aktieselskabet Burmeister & Wain's Maskin- og Skibsbyggeri, Copenhagen, Denmark, a company of Denmark
Filed Sept. 17, 1963, Ser. No. 309,569
Claims priority, application Denmark, Sept. 20, 1962, 4,085/62
8 Claims. (Cl. 176—37)

This invention relates to an installation including a nuclear reactor which comprises a pressurized liquid circuit with or without boiling and one or more rooms for receiving escaping liquid and vapor in case of bursts in the liquid circuit.

It is known to place a reactor with associated cooling circuit and auxiliary systems in a so-called containment vessel which is designed to receive escaping fluids in the case of a reactor breakdown such as coolant and or moderator fluid as well as explosion products and fragments from an explosion, escaping fuel, etc. Particularly in reactors which are cooled and/or moderated by a liquid of elevated pressure and elevated temperature, a burst will have the effect that by the escape, vapor of elevated pressure will be formed and the containment vessel should be dimensioned in conformity with this high pressure, i.e. have walls of great thickness.

It has been suggested to overcome this drawback by using a pressure reduction system which comprises a water pool or basin, and pipes which from the reactor room extend down into the water of the basin, so that escaping vapor will, wholly or substantially, be condensed in the water, whereby the pressure acting on the walls of the reactor room, in case of reactor breakdown, will be reduced. Such water basin should have a free surface as, in addition to vapor, air from the reactor room will flow through the basin, and an outlet for this air from the water basin should be established. This arrangement will, therefore, not be suitable for use in connection with mobile reactor installations, for example in ships, where the movements of the ship may jeopardize the functionability of the arrangement.

It is an object of the invention to remedy this deficiency and the installation according to the invention is characterized in that in said room provision is made for a system of closed, wholly or substantially liquid-filled surface condenser elements which contain a strongly distributed amount of liquid, and which are placed in such an arrangement that escaping vapor will in any circumstance be forced to pass around the elements.

Hereby it is attained that the condenser elements will remain perfectly effective irrespective of the position and movement of the elements, so that the intended condensation of escaping vapor and consequential pressure reduction in said room, will always be attained irrespective of the movements of the ship, and even in case that the ship, subsequent to average, is lying on her side, or even with her keel upwards. It will, however, be understood that the installation may also be used in connection with stationary plants, or in connection with mobile plants other than ships' plants, for example in locomotives which in case of collision, derailing, etc. may assume corresponding positions. As the condenser elements of the system are closed and without any mutual connection, a possible bursting of one condenser element may result in only a minor reduction of the heat-dissipating capacity of the condenser.

The condenser elements may according to the invention be placed in the reactor room, whereby the latter operates as a containment vessel. This arrangement may, however, also be used when around the reactor room, provision is made for a separate containment vessel, for example if such vessel is required by the approving authorities. For the purpose of affording access to the reactor, for example with a view to inspection and possible refueling, some of the condenser elements may according to the invention be removably arranged.

Alternatively, the condenser elements may according to the invention be placed in one or more ducts which communicate the reactor room with a separate room for reception of escaping vapor and entrained air. This separate room may be constituted by a room adjacent or superjacent the reactor. The refueling room, which has a comparatively large volume, may for example be used.

The ducts may according to the invention be provided with inlet openings from the reactor room at different places over their lengths. If so, it is possible to obtain an improved utilization of the individual condenser elements. The inlet and/or outlet openings of the ducts may according to the invention be closed with diaphragms which are dimensioned to be broken by a small pressure difference. Hereby ventilation through the ducts is prevented during normal operation of the installation, which ventilation might involve the risk of corrosion of the condenser elements.

According to the invention, the condenser elements may be staggered in relation to each other so as to function as shielding against radiation from the reactor. Hereby, it becomes possible to reduce other radiation protection provided around the reactor. In support of the effect, neutron-absorbent substances may according to the invention be added to the liquid in the condenser elements or, for the purpose of improving the gamma-absorption, substances of great specific weight may be added to the liquid.

The condenser elements may according to the invention be provided with an external surface coating promoting droplet condensation, which affords a better heat transition between the vapor and the elements than film condensation.

Figure 2:
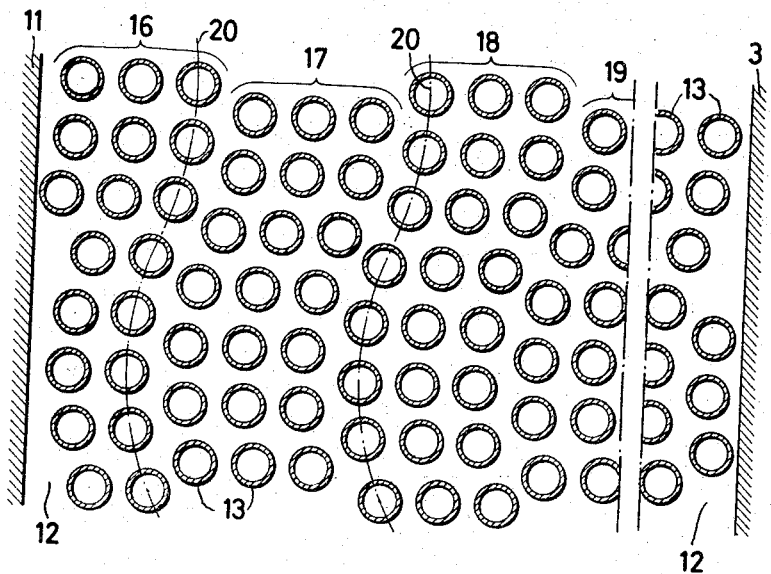
Figure 3:
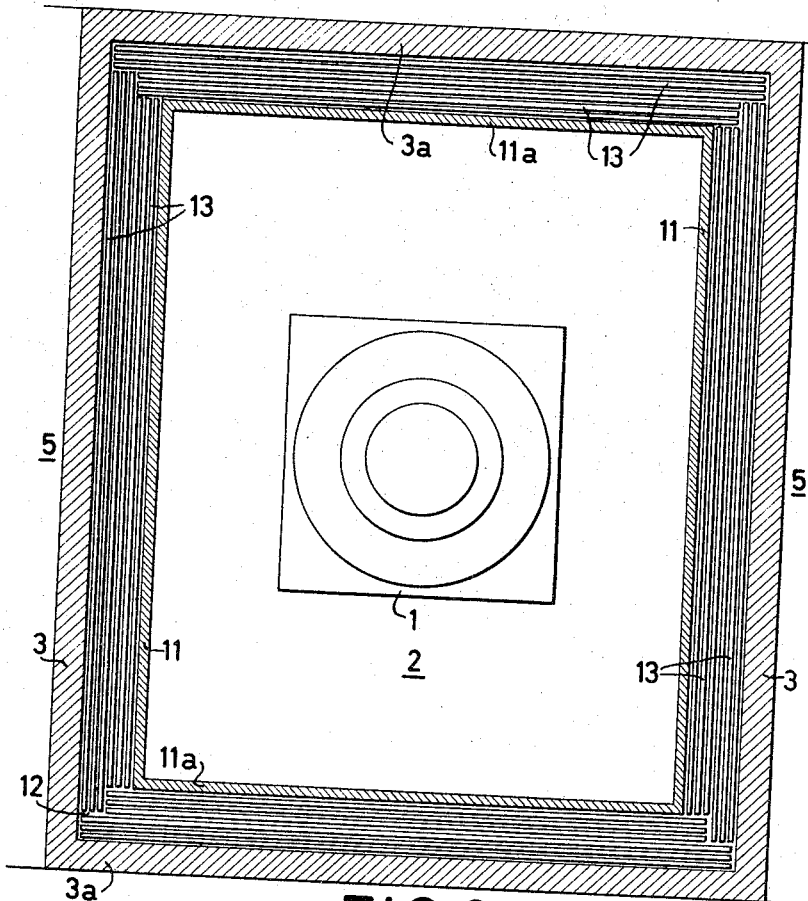

The invention will be explained in detail in the following with reference to the accompanying diagrammatical drawing, where FIG. 1 shows a vertical partial section in the athwart ship direction of a ship provided with a nuclear reactor installation including a pressure reduction or suppression system embodying the present invention, the condenser elements of the system being omitted for the sake of clarity;

FIG. 2 is a fragmentary vertical section through one of the ducts shown in FIG. 1, on a larger scale, showing some of the condenser elements in section; and FIG. 3 is a horizontal cross section along line III—III in FIG. 1 on a slightly enlarged scale, in which also some condenser elements have been omitted for the sake of clarity.

The ship shown in FIG. 1 is propelled by means of a diagrammatically shown reactor installation 1. This installation is located in a reactor room 2, which is surrounded by shielding side walls 3 and a shielding ceiling 4. On each side of the reactor room 2 provision is made for a coffer dam 5, and outside said dam there are wing tanks 6.

Above the reactor room 2 there is a refueling room 7 where the fuel-loading machinery and other equipment of the reactor may be located. The drawing shows diagrammatically a crane beam 8 with a traveling trolley 9. Next to the refueling room 7 there is a sluice 10 for refueling purposes.

Parallel to, and at a distance within, the shielding walls 3 of the reactor room there are walls 11 which together with the walls 3 define vertical ducts 12, wherein there is located a system of condenser elements which in the interest of perspecuity are not shown in FIG. 1. In the embodiment shown, the condenser elements consist of a plurality of horizontal end-closed tubes 13, see FIG. 2, which extend in the longitudinal direction of the ship, and whose mutual position is fixed by means of members, such as tube plates or wiring, between the walls of the ducts. Each individual tube 13 is liquid-filled to somewhat below its maximum volume capacity, for example 90%, inter alia out of regard to heat expansion.

The ducts 12 are at bottom closed by means of thin diaphragms 14 in the wall 11 and at top by means of correspondingly thin diaphragms 15 in the ceiling 4. These diaphragms are so dimensioned as to be broken at a quite small pressure difference, so that the ducts 12 normally are closed but, in case of a reactor breakdown which causes the escape of vapor from the reactor 1, will immediately be broken and thereby afford possibility for the vapor to pass from the reactor room 2 to the refueling room 7. If such reactor breakdown should occur, a substantial part of the escaping vapor will, therefore, flow upwardly through the ducts 12 and will, when flowing past the liquid-filled tubes 13, be partly condensed on the outer sides of said tubes, whereby the vapor pressure will fall rapidly. The reduction, conditional thereupon, of of the pressure occurring in the reactor room in the case of reactor breakdown, affords the possibility of reducing the thickness of the reactor room walls 3.

As shown in FIG. 2, the tubes 13 are arranged in groups, each consisting of three substantially vertically extending rows of superimposed tubes. FIG. 2 shows part of four such groups 16, 17, 18 and 19, it being apparent from FIG. 2 that there may be a greater number of such tube groups between the internal and external walls 11 and 3, respectively, of the vertical duct 12 and that the outermost vertical row in groups adjacent said vertical walls may be incomplete. The tubes in the three vertical rows of the individual groups are, however, not positioned exactly vertically above each other, but the center lines of the tubes are positioned on a sinusoidal curve 20. Within each group 16–19, three tubes from one row each are positioned in the same horizontal plane, and the tubes of two adjacent groups, for example 16 and 17, are staggered half a tube diameter in relation to each other in the vertical direction. By the shown arrangement of the tubes, it is attained that in the duct 12 there is no rectilinear radiation path which does not hit a plurality of the tubes 13. Consequently, the tubes 13 function as an effective shielding against radiation from the reactor room.

FIG. 3 shows the reactor room 2 surrounded by the two vertical walls 11 as seen in FIG. 1 and by two further vertical walls 11a extending athwart ship, i.e., perpendicular to the walls 11. Similarly, there are two outer shielding walls 3a parallel to the walls 11a and defining therewith two vertical ducts which have the starboard and athwart sides joined with the ducts 12 as seen in FIG. 1 so that, in fact, there is provided one continuous annular space around the reactor room between the inner walls 11 and 11a and the outer shielding walls 3 and 3a.

In each duct 12, FIG. 3 shows two subgroups, each consisting of three horizontal tubes 13 extending parallel to the associated vertical wall of the duct, but it will be understood from the preceding and from FIG. 2 that there will normally be provided a far greater number of such tubes. As shown in FIG. 3, the length of the tubes 13 in each subgroup is substantially equal to the length of the associated duct, but is slightly different in adjacent groups so that the ends of the tubes overlap in a zigzag pattern whereby the shielding properties of the tube arrangement as mentioned above are also maintained at the corners of the reactor room 2.

It will be appreciated that, for manufacturing or other reasons the tubes 13 may be shorter than shown whereby two or more tubes may be needed to cover the full length of each associated duct. In such case, it will be expedient to provide a similar zigzag pattern or staggering of the adjacent tube ends intermediate the ends of the duct.

The particular arrangement of ducts to form a continuous annular space around the reactor room, as shown, is only intended to illustrate one example of the embodiment of the invention. Generally, this arrangement may be varied according to the practical considerations and to any particular requirements of a given reactor installation, as may the details of the condenser and their arrangement.

As mentioned above, the tubes 13 contain a liquid, preferably water, but other liquids may also be used. If desired, the tubes may thus contain a cooling mixture, especially if the ship is intended for sailing in arctic climate. To the liquid in the tubes 13, neutron-absorbent substances may be added, for example, compositions containing boron or substances of high specific gravity and consequential high absorption cross section for gamma-radiation. Boron may be added in such chemical composition as to prevent corrosion of the tubes, but for this purpose inhibitors may furthermore be added to the liquid.

Above it is mentioned that the liquid in the tubes 13 does preferably not fill the tubes entirely. The remaining volume may, if desired, be evacuated prior to the closing of the tubes whereby it is possible to obtain an improvement of the interior heat transition coefficient. The remaining volume in the condenser tubes may also be filled with an inert gas.

The closing of the tubes 13 at their ends may be performed in any suitable manner, for example by welding, plugging by means of a screw plug, or squeezing together and welding of the tube ends. When each tube 13 is closed and without connection with the other tubes, the use of comparatively expensive tube plates or heaters is avoided, and the safety of the condenser system is also increased by the fact that leakage from a single or a number of tubes will not influence the operability of the other tubes. However, within the scope of this invention, the individual tubes 13 shown in FIG. 2 may be replaced by tube coils as well as the tubes or the tube coils may be arranged according to any pattern whatsoever other than that shown, however, preferably according to such pattern as by means of its geometrical shape contributes to the screening of the reactor. Instead of tubes, it is also possible to use condenser elements of another construction, for example plate radiator-like elements.

In the closed ducts 12, an inert gas may be enclosed which may counteract external corrosion of the condenser elements. In the ducts provision may also be made for a water-absorbent medium such as silica gel. The condenser elements may also be externally or internally prepared with suitable means, for example paint or galvanization, which counteract corrosion, and they may externally be coated in such manner as to promote a droplet condensation of the vapor passing by.

The shown arrangement of the condenser elements in vertical ducts along two or more walls of the reactor room has the advantage that it does not prevent free access to the reactor through a hole 21 in the ceiling 4 of the reactor room, which hole, as shown, is normally closed by means of a detachable cover 22. However, the condenser elements may also be otherwise arranged, for example, in the reactor room proper. Out of regard to the circumstance that it is normaly desirable to be capable of gaining access to the reactor during operation or shortly after the shut-down of the reactor, it may be expedient that some of the condenser elements can be removed from their operational position. By using tube bundles as condenser elements, all or part of the tube bundles positioned above the reactor may, for example, be adapted for being raised or moved aside, or for being swung upwardly on hinges.

In the embodiment shown, the vapor has access to the ducts 12 solely through the diaphragms 14 arranged at the bottom of the ducts, but for a better utilization of the cooling property of the condenser elements, it may be expedient to provide further inlet openings to the ducts at one or more higher levels in said ducts. It is evident that preferably these openings will in such case also be closed with readily breakable diaphragms corresponding to the diaphragms 14. It will also be seen that the invention can be realized in many ways other than the one described above and shown in the accompanying drawing.

What I claim is:

1. In an installation including a pressurized liquid circuit, a means for preventing the escape of liquid and vapor in case of said liquid circuit bursting, said means comprising a first chamber surrounding said liquid circuit, at least one second chamber for the reception of the escaping liquid and vapor, duct means connecting said first and second chambers, a plurality of substantially liquid-filled surface condenser elements located in said duct means with said elements being arranged in superimposed sinusoidal rows.

2. An installation comprising a shell defining an outer containment, means within said containment defining a first chamber, a nuclear reactor located within said first chamber and including a pressurized liquid circuit, means within said containment defining a second chamber arranged for receiving liquid and vapor escaping from said reactor in case of a rupture in said liquid circuit, at least one duct having at least one inlet opening from said first chamber and one outlet opening to said second chamber, a plurality of closed, at least substantially liquid-filled condenser elements located within said duct, each of said openings of said duct being normally closed by a diaphragm which is dimensioned to break at a small differential pressure, and said duct containing an inert gas.

3. An installation as claimed in claim 2 wherein a water absorbent media is disposed in said duct.

4. An installation as claimed in claim 2 wherein the condenser elements are staggered in relation to each other so as to function as a shielding against radiation from the reactor.

5. A condenser as claimed in claim 2 wherein the liquid within the condenser element is a cooling mixture.

6. A condenser as claimed in claim 2 wherein said liquid within the condenser element includes a neutron absorbing substance.

7. A condenser according to claim 2 wherein said liquid in the condenser elements includes substances of great specific gravity.

8. A condenser as claimed in claim 2 wherein said condenser elements have an external surface coating for promoting droplet condensation.

References Cited by the Examiner
UNITED STATES PATENTS

| | | |
|---|---|---|
| 3,008,889 | 11/1961 | Junkins. |
| 3,022,238 | 2/1962 | Kolflat. |
| 3,056,736 | 10/1962 | Went et al. _____ 176—37 |
| 3,115,450 | 12/1963 | Schanz. |
| 3,158,546 | 11/1964 | Cordova _____ 176—37 |
| 3,168,445 | 2/1965 | Ziegler et al. |

OTHER REFERENCES

"Closed Cycle Boiling-Water Reactor," Power, Engineering and Management Section, September 1955, pp. 75–81.

"New Reactor Promises Competitive Power," Chemical and Engineering News, vol. 39, No. 28, July 10, 1961, pp. 21 and 22.

CARL D. QUARFORTH, *Primary Examiner.*

L. DEWAYNE RUTLEDGE, LEON D. ROSDOL,
*Examiners.*

J. V. MAY, H. E. BEHREND, *Assistant Examiners.*